United States Patent
Fueslein et al.

[15] 3,648,780
[45] Mar. 14, 1972

[54] CONTROL MECHANISM FOR DISK HARROW

[72] Inventors: Jerome L. Fueslein, Linden; William M. Adams, Stockton, both of Calif.

[73] Assignee: International Harvester Company, Chicago, Ill.

[22] Filed: June 8, 1970

[21] Appl. No.: 44,454

[52] U.S. Cl. ............................ 172/319, 172/413, 172/580, 280/414.5
[51] Int. Cl. .................................. A01b 63/22, A01b 65/06
[58] Field of Search .......................... 172/395–396, 238, 172/241, 326–328, 677–680, 318–319; 280/414.5

[56] References Cited

UNITED STATES PATENTS

| | | | |
|---|---|---|---|
| 3,590,928 | 7/1971 | Mirus | 172/240 |
| 3,292,714 | 12/1966 | Tsuchiya et al. | 172/328 |
| 2,580,100 | 12/1951 | Johansen et al. | 172/396 |
| 2,857,724 | 10/1950 | Kenney et al. | 172/680 |

Primary Examiner—Robert E. Pulfrey
Assistant Examiner—C. W. Hanor
Attorney—Floyd B. Harmon and F. David AuBuchon

[57] ABSTRACT

A disk harrow of the wheel-controlled-type having a pivoted hitch frame wherein the longitudinal spacing between the disk gangs is minimized by the provision of lifting mechanism which vertically moves the supporting wheels in a substantially straight line relative to the supporting frame between operating and transport positions of the implement, and wherein a connection is provided between the lifting mechanism and the hitch frame to effectively lock the hitch and gang supporting frames together in the transport position.

6 Claims, 5 Drawing Figures

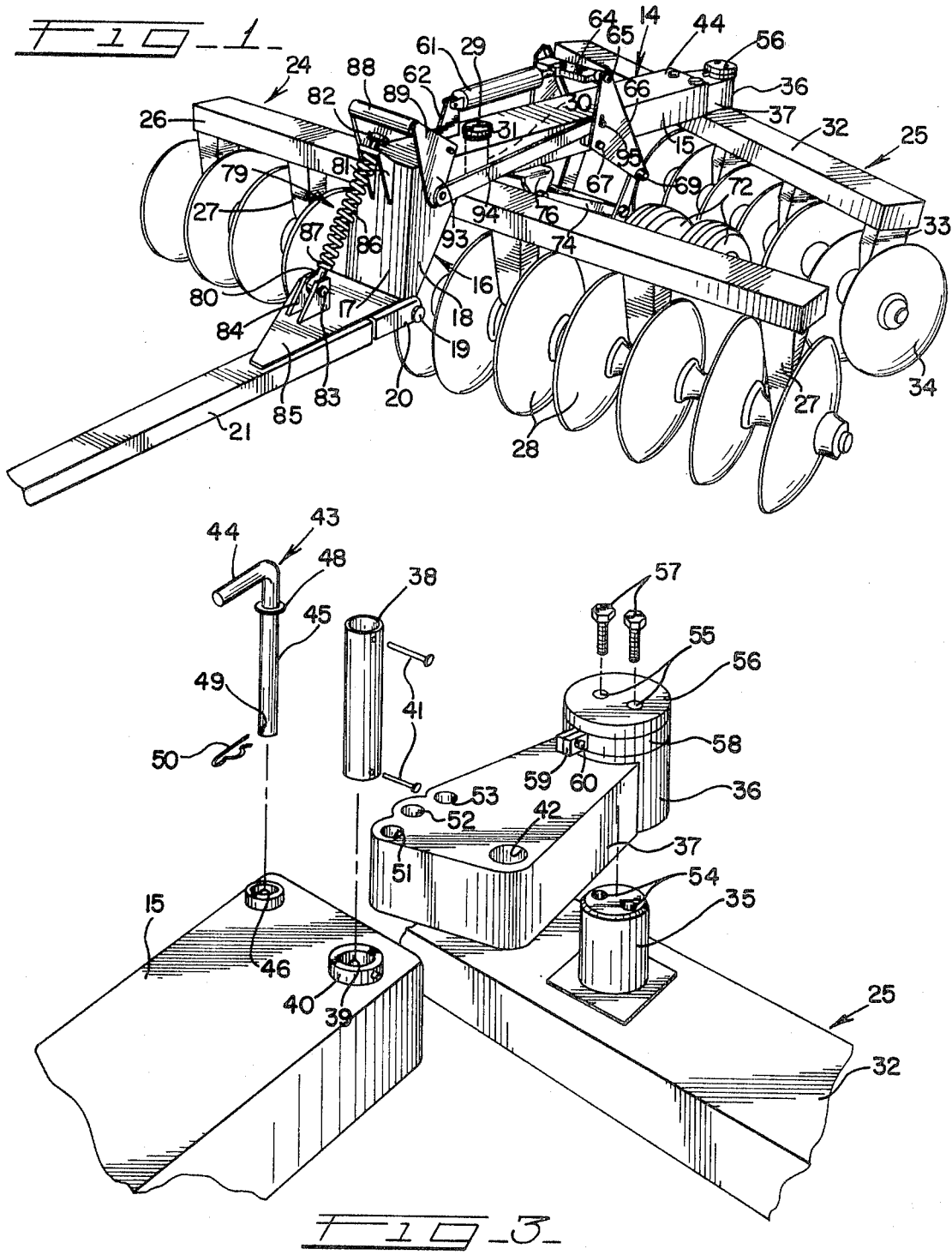

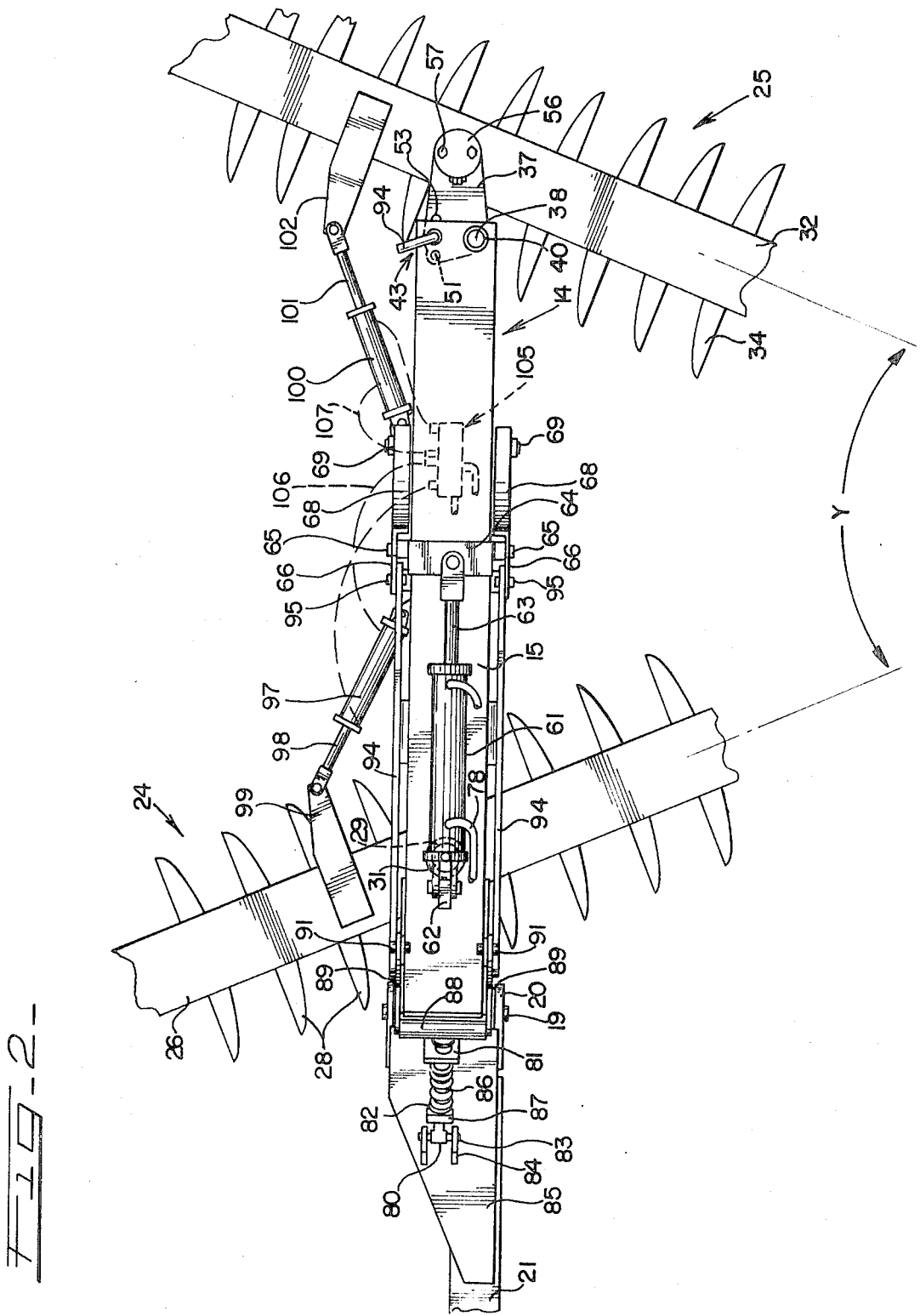

CONTROL MECHANISM FOR DISK HARROW

BACKGROUND OF THE INVENTION

This invention relates to earth working implements and particularly to disk harrows. More specifically, the invention concerns improved control means for wheeled disk harrows.

The conventional wheel controlled offset disk harrow comprises a rectangular frame to which each disk gang is secured at spaced locations by crude means involving the expenditure of considerable time and labor to effect changes in the relationship of the gangs to meet soil requirements and operating needs. In such an implement the frame often limits the placement of the supporting wheels and the wheels are customarily mounted on crank arms extending rearwardly from a transverse shaft, their arc of vertical swinging movement between operating and transport positions of the implement being such as to require spacing the gangs far enough apart to clear the wheels, resulting in the implement being unnecessarily long and thus difficult to control. Furthermore, the pivotal connection of the implement hitch to the tool-carrying frame section of a conventional disk harrow, while it permits the disk gangs to follow ground contour during operation, renders the harrow unstable in transport, particularly when traveling over uneven terrain. Therefore, an important object of the present invention is the provision of an offset disk harrow of improved construction.

Another object of the invention is the provision of improved disk harrow control mechanism whereby the tool-carrying frame is allowed to pivot relative to its hitch structure during operation but is automatically locked against such pivoting when the implement is raised to its transport position.

Another object of the invention is the provision, in a wheel controlled disk harrow having a pivoted hitch structure and power operated lift means for raising and lowering the frame relative to the wheels, of connecting means between the lift means and the hitch structure for locking the hitch structure to the tool-carrying frame when the implement is raised to its transport position, such locking means being releasable upon lowering the implement to its operating position.

Another object of the invention is the provision of a wheel controlled disk harrow wherein the wheels are mounted on the supporting frame between the disk gangs by means effecting movement of the wheels in a substantially straight line vertically between operating and transport positions accommodating closer longitudinal spacing between the disk gangs, whereby the harrow can be attached to the tractor with minimum offset therefrom.

DESCRIPTION OF THE DRAWINGS

FIG. 1 is a perspective view, with parts removed, of a wheel controlled offset disk harrow embodying the features of this invention;

FIG. 2 is a plan view, with parts removed, of a portion of the implement shown in FIG. 1, and illustrating the structure of the unitary supporting frame for the disk gangs;

FIG. 3 is an enlarged exploded view in perspective of a portion of the structure shown in FIGS. 1 and 2;

DESCRIPTION OF THE PREFERRED EMBODIMENT

Figure 4:
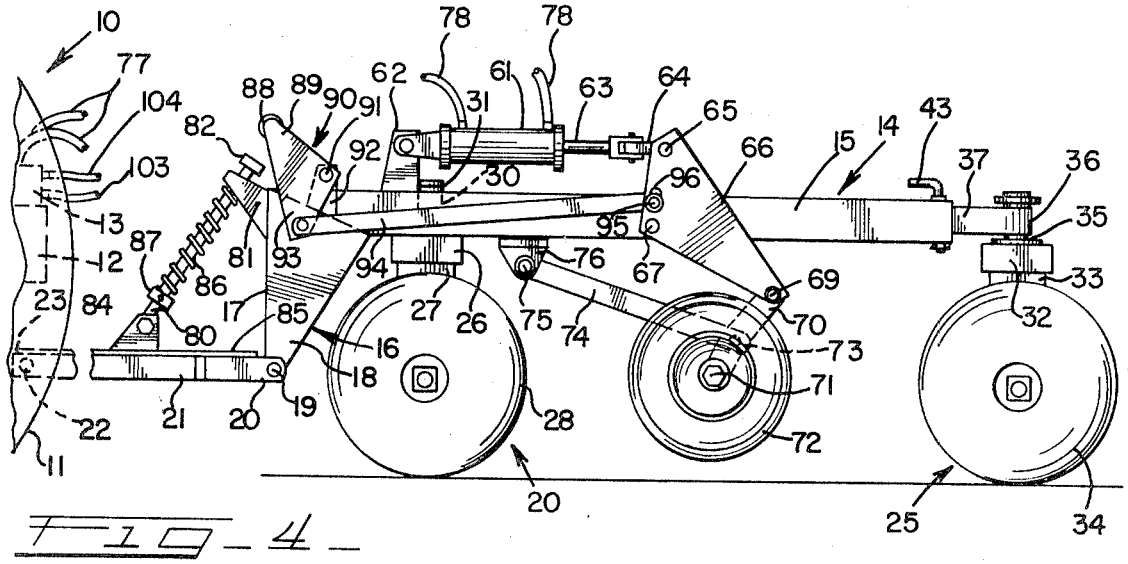
FIG. 4 is a view in side elevation, with parts removed, of the rear end of a tractor to which is connected the harrow of this invention, the latter being shown in a lowered position with the disk gangs, for purposes of simplification, in parallel relation.

Depending upon its size the implement of this invention may be propelled by a wheeled tractor or one of the crawler type. The tractor indicated in FIG. 4 is designated by the numeral 10 and is of conventional construction, having laterally spaced rear wheels 11 and a body 12 upon which is mounted a source of fluid under pressure 13 including valve means of any well known type for controlling the flow of fluid to and from hydraulic power transmission devices on the implement.

The disk harrow of this invention comprises a central longitudinally extending supporting frame assembly 14 which includes a generally rectangular hollow forward main frame member 15 to the forward end of which is affixed a depending bracket 16 having a forward face 17 and triangular side plates 18.

The lower end of bracket 16 carries a transverse pivot pin 19 upon which are mounted a pair of ears 20 affixed to the rear end of a hitch member 21 and accommodating vertical swinging movement of the hitch member relative to the unitary frame assembly 14. The forward end of the hitch 21 is pivotally connected by a pin 22, indicated in FIG. 4, to the relatively stationary drawbar 23 of the tractor.

A pair of front and rear disk gang assemblies 24 and 25, respectively, are provided and are substantial duplicates, the front gang comprising a transverse horizontal beam 26, rectangular in section and having a plurality of hangers 27 depending therefrom supporting axially aligned rotatable disks 28. Disk gang 24 is pivotally supported from main frame section 15 for horizontal angular adjustment relative thereto by the provision of a vertical spindle 29 affixed to beam 26 centrally thereof and projecting upwardly through an opening 30 therein and held against vertical displacement by a removable collar 31.

It will be observed from FIGS. 1 and 2 that the implement illustrated in the drawings is a right hand offset disk harrow and that the disks of the front gang 24 face forwardly and outwardly to the right of the direction of travel. Rear gang 25 comprises a horizontal supporting beam 32, also rectangular in section, which diverges to the right with respect to front beam 26. A plurality of hangers 33 are secured to and depend from beam 32 and support at their lower ends a series of axially aligned disks 34 the concave faces of which are directed forwardly and outwardly to the left.

Rear gang 25 is mounted on frame 14 for angular adjustment relative thereto and to the front gang by the provision of a vertical spindle 35 centrally affixed to beam 32 and projecting upwardly therefrom for pivotal reception in the bearing portion 36 of rear frame member 37 forming part of the unitary supporting frame 14. The forward portion of member 37 is slidably receivable in the hollow rear end of main frame member 15 and is pivotally mounted on a hinge pin 38 carried in an opening 39 in the rear end of member 15 and laterally offset from the center line thereof. Opening 39 terminates at each end in a boss 40, only one of which is shown, on upper and lower faces of member 15 to receive the ends of hinge member 38, and each boss is apertured to receive a securing pin 41. Hinge pin 38 registers with an opening 42 in member 37, and the latter is made integral with member 15 by the provision of a locking key or pin 43 having a handle 44 and a shank 45 (see FIG. 3) receivable in an opening 46 in member 15 and terminating at its upper end in a boss 49 engageable with a shoulder 48 formed on shank 45, the lower end of shank 45 having an opening 49 therein to receive a retaining cotter 50.

Frame member 37 is angularly adjustable relative to frame member 15 about the axis of hinge 38 for a purpose fully explained in copending U.S. application, Ser. No. 44,453, filed June 8, 1970, and is rigidly held in its selected adjusted position by insertion of key 43 in one of a plurality of openings 51, 52 and 53 formed in member 37 on an arc having opening 42 as its center.

The upper end of spindle 35 has threaded recesses 54 which register with openings 55 in a cap 56 to receive bolts 57 to hold the disk gang against vertical displacement from frame 14. Cap 56 is spaced from the upper end of bearing portion 36 by a removable bail 58 having outwardly bent ends 59 connected by a bolt 60. To vertically adjust the position of the rear gang the spacer bail 58 may be removed and placed between beam 32 and the lower end of bearing portion 36.

Raising and lowering of the implement is accomplished by the provision of a hydraulic cylinder 61 pivotally anchored to a lug 62 secured to the forward portion 15 of the frame 14 and having a piston rod 63 slidable therein connected to a cross bar 64 mounted on trunnions 65 in the upper ends of a pair of lifting members in the form of triangularly shaped bell cranks 66 spaced from and fulcrumed by pivot pins 67 on the sides of main frame members 15 and having inwardly directed flanges 68 terminating adjacent the sides of the frame. The lower end of each bell crank 66 is pivoted on a stud 69 at the upper end of a wheel-carrying member or standard 70 the lower end of which is mounted on a stub axle 71 carrying a wheel assembly 72, the portion of bell crank 66 between fulcrum 67 and stud 69 forming a lift arm for the wheel assembly 72.

Standard 70 is pivotally connected medially of its ends at 73 to the rear end of a crank arm 74 the other end of which is affixed to a transverse shaft 75 rotatably mounted at each end in a bracket 76 carried by the frame 14, and on an axis below and forwardly of the axis 67 of the lift arm.

Figure 5:
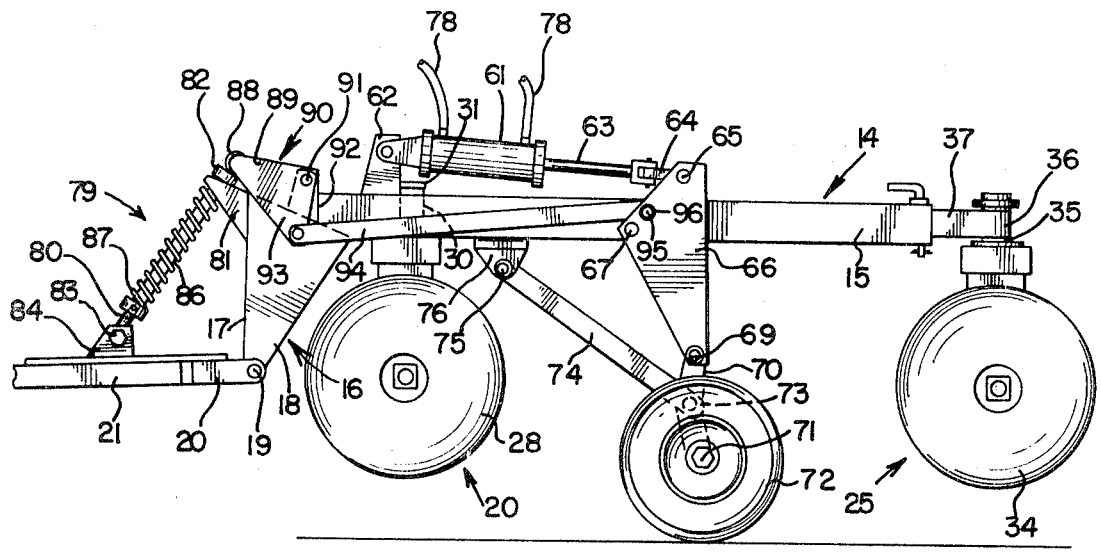
FIG. 5 is a view in side elevation similar to FIG. 4 showing the harrow in a raised position.

Extension and retraction of piston rod 63 in cylinder 61 rocks bell crank 66 about its fulcrum 67 to swing crank arm 74 about the axis of shaft 75 to raise and lower the implement, arm 74 swinging on an arc having both vertical and horizontal components about the axis 75 and swinging wheel-carrying standard 70 between the positions thereof shown in FIGS. 4 and 5 and constraining the wheel 72 to move in a straight line vertically. Fluid under pressure for this purpose is supplied to cylinder 61 from the pressure source and valve control housing 13 in well known manner through tractor hose lines 77 (see FIG. 4) and cylinder lines 78 to extend and retract piston rod 63. As viewed in FIG. 4, the piston rod is partly retracted and wheels 72 are being lifted relative to the frame to allow the disks to descend to the operating position of the implement. Extension of rod 63 rocks crank 66 in a clockwise direction as viewed in FIG. 5 to swing crank arms 74 downwardly and raise the implement to its transport position.

Viewing FIGS. 4 and 5 it will be noted that the lift arm portion of crank 66 between axes 67 and 69 forms with crank arm 74 a generally parallel link arrangement, and standard 70 forms a lever which swings clockwise relative to arm 74 from the transport position of the implement to the operating position of FIG. 4, and the arc of travel of the lower end of the lever has a horizontal component in a direction opposite and equal to the horizontal component participated in by the crank arm 74. The result is that the wheels move in a vertical line between these positions requiring substantially less spacing between the disk gangs than would be needed if the lifting linkage, represented by bell crank 66, were connected directly to arm 74 in the conventional manner. A more compact implement is thus provided which is more easily controllable than conventional offset disk harrows and offers improved operating characteristics.

Between the operating position of FIG. 4 and the transport position of FIG. 5 the entire implement and hitch more upwardly about the pivotal draft connection 22 on the tractor. In the operation of an offset disk harrow such as that described herein the disks of the front gang tend to dig somewhat deeper than those of the rear gang, necessitating the provision of means for exerting pressure on the rear gang to assure uniform penetration. Also, when transported, it is desirable that the implement be maintained level to avoid the rocking and bouncing action that would result were the tool-carrying frame free to rock about the hitch pivot 19. It is further important that, during operation, the implement be substantially free to move about both pivots 19 and 22 to accommodate the implement to changes in ground contour. Means by which these ends are achieved include connecting linkage extending between the lifting mechanism and the hitch structure, and now to be described.

A leveling and weight transfer spring arrangement is indicated by the numeral 79 and includes a lost motion connection between the hitch and the supporting frame which comprises an elongated bolt 80 slidably receivable in an opening provided in a lug 81 forming part of the frame and affixed to face 17 of bracket 16. Bolt 80 has a head 82 engageable with lug 81 and its lower end is pivotally connected to a bolt 83 mounted between a pair of lugs 84 secured to a triangular plate 85 affixed to the rear end of hitch member 21. A compression spring 86 surrounds bolt 80 between an adjustable collar 87 and lug 81 and in normal operation of the implement exerts pressure through the lug to bias the frame clockwise about pivot 19, as viewed in FIGS. 4 and 5. Rocking of the implement counterclockwise is opposed by the action of spring 86 and limited by engagement of bolt head 82 with a roller 88 carried by arms 89 of a pair of elements forming a bell crank 90 fulcrumed on pins 91 mounted on lugs 92 affixed to the sides of frame member 15. The other arm 93 of bell crank 90 is pivotally connected to one end of a thrust link 94 the other end of which is mounted on a pin 95 carried in a slot 96 in bell crank 66 between the axes of trunnions 65 and pin 67.

In the operating position of the implement represented by the disposition of the parts indicated in FIG. 4, roller 88 is not in contact with the head 82 of bolt 80, allowing the implement to float about the axis of pin 19 to permit the implement to follow changes in ground contour.

When the implement is to be raised for transport, fluid under pressure is supplied to cylinder 61 to extend rod 63, rocking bell crank 66 clockwise and lowering wheel-carrying arms 74. Link 94 is shifted rearwardly rocking bell crank 90 counterclockwise until roller 88 engages bolt head 82 and forces it into engagement with lug 81, thus locking hitch 21 rigidly with frame 14 while permitting pivoting about the axis of draft pin 22 and maintaining the implement level during transport.

The front and rear disk gangs are adjusted about the axes of the respective mounting spindles 29 and 35 to the desired angular relationship for operation, as, for example, the included angle "Y" indicated in FIG. 2. The front gang is angularly adjusted by an extensible and retractable force transmission member which may be a turnbuckle, if desired, but is preferably a hydraulic cylinder 97, as shown in FIG. 2. Cylinder 97 is pivotally anchored to the side of forward main frame member 15 and a piston rod 98 slidable therein is pivotally connected to a bracket 99 affixed to and extending rearwardly from beam 26.

Similar extensible means are provided for changing the angle of the rear gang 25 in the form of a hydraulic cylinder 100, although a turnbuckle may be used, if desired. Cylinder 100 is pivotally anchored to the side of main frame member 15, and piston rod 101 slidable therein is pivotally connected to a bracket 102 affixed to and extending forwardly from rear beam 32.

Hydraulic fluid under pressure is supplied to the cylinders 97 and 100 from the tractor source through tractor hose lines 103 and 104, indicated in FIG. 4, and is directed to cylinders 97 and 100 through the intermediary of a directional valve 105 shown diagrammatically in FIG. 2, the construction of which forms no part of this invention. It may be noted, however, that tractor hose lines 103 and 104 connect, respectively, with valve lines 106 and 107 from which fluid is distributed to cylinders 97 and 100 under the control of the tractor operator.

It is believed that the construction and operation of the disk harrow of this invention and the control means therefor will be clearly understood from the foregoing description.

What is claimed is:

1. In a wheel controlled disk harrow having a supporting frame, front and rear disk gangs mounted on the frame, a lift arm, means pivotally mounting said arm on the frame in a manner to dispose a part of the arm downwardly from said mounting means, power transmission means on the frame operatively connected to said arm for swinging said part thereof alternately upwardly and downwardly in an arcuate path in a vertical plane about said mounting means between positions respectively corresponding to the operating and transport positions of the implement, a standard pivotally depending from said downwardly disposed arm part, supporting wheel means mounted on a lower portion of the standard for movement therewith between vertically spaced operating and transport positions for the implement pursuant to swinging movement of said arm, and means pivotally connected between said standard and the frame to constrain said wheel means to move in proximity to straight line extending between said operating and transport positions, a hitch adapted for attachment to a tractor is pivotally connected to said supporting frame and means are provided for maintaining the disk gang supporting frame level during vertical movement thereof between said operating and transport positions comprising a lost motion connection between said hitch and said supporting frame accommodating limited movement of the frame about the pivotal connection of the hitch thereto, said lost motion connection permits relative pivoting of the frame relative to the hitch in the operating position of the implement and connecting means are provided between said lift arm and said lost motion connection including releasable locking means operative upon movement of the implement to its transport position to lock the hitch to the frame, and wherein said lost motion connection includes a bolt connected to the hitch and having a head, the frame having an opening therein to slidably receive the bolt and engageable with the head to limit pivoting of the frame in one direction relative to the hitch, said locking means being a rockable member pivoted on the frame and operatively connected to said lift arm to rock said rockable member to a position in engagement with said bolt head to confine it therebetween and the frame.

2. In a wheel controlled disk harrow having supporting frame, a hitch pivoted to the frame, a hitch pivoted to the frame and adapted for attachment to a tractor, front and rear disk gangs mounted on the frame, vertically spaced generally parallel link means mounted at one end on the frame between said disk gangs and swingable in a vertical plane between positions corresponding to operating and transport positions of the implement, the arc of swinging movement of one of said link means having a horizontal component, a wheel-carrying member having pivotal connections at vertically spaced locations to the other ends of said link means, and power transmission means on the frame operatively connected to said link means for vertically swinging the latter to raise and lower the frame, said wheel carrying member being swingable relative to said link means in a horizontal direction opposite to that of said one of said link means to constrain the wheel to move in a substantially straight line vertically between said operating and transport positions of the implement, said wheel-carrying member extends generally vertically and carries the wheel at its lower end and said link means are pivotally connected to said member at vertically spaced locations above the axis of the wheel, the upper of said link means is a lift arm pivotally connected to the upper end of said wheel-carrying member and the lower of said links is a crank arm pivotally connected to said wheel-carrying member medially of its ends, said wheel-carrying member forming a lever the lower wheel-carrying end of which, upon vertical movement of said link means relative to the frame, swings horizontally in a direction opposite to and to an extent equal to that of said crank arm, said lift arm forms part of a bell crank the other arm of which is operatively connected to said power transmission means to rock the bell crank and vertically move said wheel relative to the frame, connecting linkage between said other arm of said bell crank and said hitch, said connecting linkage accommodating relative movement between the hitch and the supporting frame in the operating position of the implement, said connecting linkage including locking means effective in response to movement of the wheel to raise the implement to transport position to lock the hitch against pivoting relative to the frame, and wherein bolt means carried by the hitch has a slidable connection with the supporting frame and has a head engageable with the frame to limit pivoting of the hitch in one direction and said connecting linkage includes a rockable member mounted on the frame and rockable in response to rocking of said bell crank from a position remote from said bolt head in the operating position of the implement to accommodate pivoting of the hitch frame to a position in engagement with said bolt head with the latter confined between the frame and the rockable member to lock the hitch against pivoting relative to the frame.

3. In a tractor drawn disk harrow, supporting frame, front and rear disk gangs mounted on the frame, supporting wheels mounted on the frame between said gangs, power operated lift means on the frame including means serving as a bell crank having an arm operatively connected to said wheels and rockable to vertically move the frame relative to the wheels between operating and transport positions of the harrow, a hitch adapted for attachment to the tractor at a relatively stationary location thereon and pivotally connected to said frame, connecting means between the hitch and the frame comprising bolt means on the hitch having a slidable connection with the frame to accommodate pivoting of the frame relative to the hitch when the harrow is in its operating position and having a head thereon engageable with the frame to limit relative pivoting of the frame in one direction when the harrow is in its operating position, and locking means on the frame operatively connected to the other arm of said bell crank means and having a part automatically movable into engagement with said bolt head when the harrow is raised to its transport position to confine the bolt head between the frame and said part to lock the frame and hitch against said relative pivotal movement.

4. The invention set forth in claim 3, wherein said locking means comprises another bell crank means mounted on the frame having an arm connected to said other arm of the first mentioned bell crank means and rockable in response to rocking of the latter to move the other arm of said other bell crank means from a position remote from said bolt head in the operating position of the harrow to a position in engagement therewith in the transport position of the harrow.

5. The invention set forth in claim 4, wherein a compression spring surrounds said bolt between the hitch and the frame and yieldably resists pivoting of the frame in one direction about its pivotal connection to the hitch in the operating position of the harrow.

6. The invention set forth in claim 5, wherein a rotatable roller is mounted on said other arm of said other bell crank means, said roller engaging said bolt head to confine the latter between said roller and the frame.

* * * * *